April 22, 1969   G. L. WATERMAN ET AL   3,439,525

NONDESTRUCTIVE TESTING METHOD USING LIQUID CRYSTALS

Filed Dec. 28, 1966

INVENTORS.
GARY L. WATERMAN
WAYNE E. WOODMANSEE
BY
Sam Laub
AGENT

United States Patent Office 3,439,525
Patented Apr. 22, 1969

3,439,525
NONDESTRUCTIVE TESTING METHOD USING LIQUID CRYSTALS
Gary L. Waterman and Wayne E. Woodmansee, Seattle, Wash., assignors to The Boeing Company, Seattle, Wash., a corporation of Delaware
Filed Dec. 28, 1966, Ser. No. 605,326
Int. Cl. G01n 25/02
U.S. Cl. 73—15.4         8 Claims

ABSTRACT OF THE DISCLOSURE

This invention involves a method of applying liquid crystal materials to a surface to be tested for discontinuities. Test areas on the surface are defined through utilization of a hollow, loop forming tubular member through which a vaccum is applied, and which produces a thermally responsive contact between the crystal holding medium and the surface within the test area.

---

This invention relates to nondestructive testing methods using liquid crystal materials, and in greater detail this invention concerns a method of achieving a thermally responsive contact between a substrate to be tested for discontinuities and a liquid crystal medium which is coated on a film, said contact being achieved through vacuum application.

Infrared radiometers are presently being used for the majority of thermal nondestructive testing studies due to the ability of these instruments to measure small, rapidly changing surface temperatures associated with material discontinuities without the necessity of establishing surface contact between the radiometer and the part to be tested. Most of these radiometric measurements are made by monitoring a single point or line on the part being inspected. This means that for full coverage of a substantial area, a scanning system must be devised which will systematically move the radiometer focal point over the part to be inspected. These systems frequently become complex, expensive and difficult to use with irregularly shaped components.

Another approach to the measurement of surface temperature for nondestructive testing applications has been the use of temperature indicating paints and phosphors. These mediums undergo various physical changes at a given temperature or over a range of temperatures which result in a change in color or variations in the intensity of emitted light. These systems have a requirement of a secondary source of ultraviolet radiation in order to produce fluorescence of the medium being employed. In addition, there is a requirement of a dark room or some area where light can be temporarily reduced during testing. It should also be noted that these materials are less sensitive in that they will not respond to temperature gradients as small as those which may readily be seen with liquid crystal media.

Other systems of nondestructive testing which employ various compounds which change color with water of hydration changes will not be discussed in detail because these systems are often irreversible or are very slow in their chemical reactions thus not being sensitive enough for the rapid fluctuations necessary in nondestructive testing.

It is an object of the instant invention to devise a simple means to insure uniform thermal contact between a cholesteric medium and the substrate to be tested using vacuum means.

Other objects and applications of the instant invention will become immediately apparent to those skilled in the art from a reading of the following specification, the appended claims and by reference to the drawings wherein:

Figure 1:
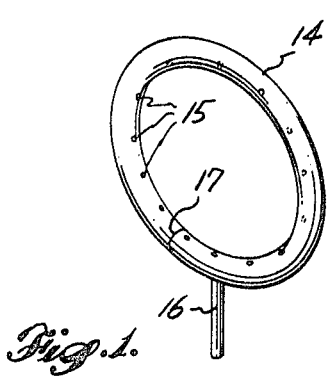
FIGURE 1 represents a hollow, tubular shaped member having a multiplicity of openings on the inside circumference with one opening on the outside circumference.

Liquid crystals, also called mesomorphs, mesophases or mesoforms, are a group of compounds which exhibit, in the liquid state, optical properties normally associated with solids. Another way of describing this behavior has been made by referring to these substances as a state of matter intermediate between solids and isotropic liquids. Although the properties of liquid crystals are not widely known, approximately one out of every 200 organic compounds exhibit liquid crystalline behavior. Mixtures of liquid crystals have been prepared which rapidly and reversibly undergo distinct color changes over variable temperature increments. Variations of the composition of these mixtures make it possible to adjust the temperature at which the color change occurs. Further discussion of the unique properties of the compositions of matter we use in this invention can be gained by reference to application Ser. No. 570,617, filed Aug. 5, 1966, in the name of Wayne Woodmansee which refers to liquid crystalline compositions of matter of sensitivity sufficient to be used for nondestructive testing purposes, said application being assigned to same assignee as the instant invention.

From this copending application, it is seen that mixtures of liquid crystal materials, principally derivatives of cholesterol, have been prepared which scatter light at different wave lengths depending upon the temperature sensitive properties of the particular derivatives of cholesterol being employed. The temperature range over which the color changes occur is variable depending upon the particular mixture being employed. We have experienced transitions from colorless to red to yellow to green to blue over approximately 1° C. in the range of 20° C. to 60° C. for the materials listed in the above copending application. The temperature transition, which is completely reversible, from red through blue takes less than one second.

The optical properties of cholesteric materials should be emphasized. White light normally incident upon a cholesteric film with a black backing is selectively scattered at various wave lengths depending upon the composition, temperature and angle at which the cholesteric film is viewed. White light normally incident upon a filled cholesteric film (a cholesteric film which has incorporated therein a finely divided dark medium as set forth in the above-mentioned copending application) is selectively scattered at various wave lengths depending upon the composition, temperature and angle at which the film is viewed. The scattering process permits a viewer to determine the temperature of the cholesteric film by observing the colors associated with the wave lengths of the principal scattering. The wave lengths which are not scattered are transmitted in the film and are absorbed by black film underlying the cholesteric materials or by the black powder dispersed in the cholesteric materials. This enhances the intensity of the scattered colors.

In the use of the word discontinuity as applied to a substrate, the following are comprehended: a void, fault, flaw or other variation in a homogeneous body; delaminations, differences in thermal conductivity caused by differing properties, voids, or various entrapped gases which cause difference in response of various areas of a substrate; differences in normally linear properties, the absence of thermal insulation in various areas of an insulating substrate and abrupt variation in normally linear functions.

Application of a liquid crystal medium in nondestructive testing is done in such a manner as to have a thermally responsive contact between the cholesteric medium and the substrate to be tested.

A flexible application device has been devised and is shown in FIGURE 1 in an elliptical view wherein a hose 14 is joined at point 17 and permanently bonded (connected) to form a hollow tubular shaped member 14 capable of being shaped in different configurations. Typical materials used for this have been polyvinyls, rubber and Tygon. A multiplicity of holes 15 are made on the inside circumference of the hollow member (ring). At least one pitot opening 16 capable of being adapted to fit into vacuum systems is inserted into the member 14. The hose is assembled so as to include sufficient area within its circumference to enable adequate testing to be done within this defined area.

Figure 2:
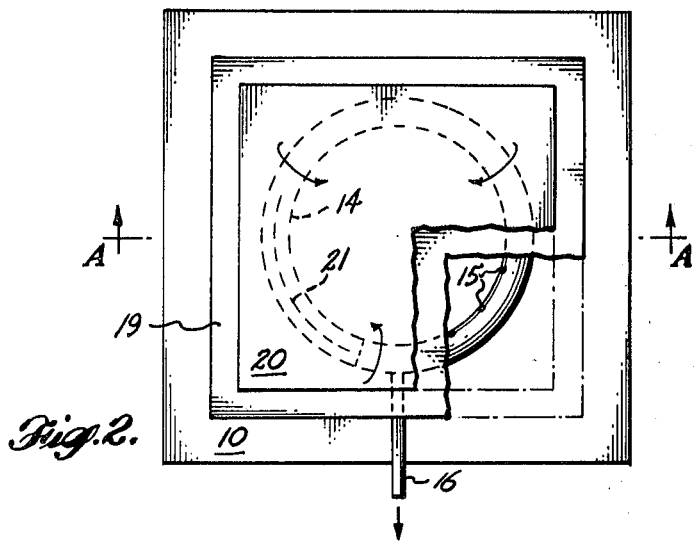
FIGURE 2 shows the hollow cylinder of FIGURE 1 in combination with at least two separate layers and a substrate of an article.

In FIGURE 2, the member 14 is placed on the object 10 to be tested and connected with vacuum drawing means (not shown) at the pitot opening 16 so that air is evacuated through the openings 15 inside the inner circumference of the member 14. Thereafter at least one solid film layer 19 suitably coated with a selected cholesteric medium 20 is placed upon the member 14, the top of which has thereon a bonding agent 21 such as an adhesive, vacuum grease, double back or adhesive tape. It is also possible to have a retaining hoop placed over the film layer. In FIGURE 2, as a vacuum is drawn, film 19 is drawn inward in the middle region of the area defined by the circumference of the member 14. Eventually as more vacuum is drawn, film 19 and medium 20 make a thermally responsive contact with the substrate 10 and as the vacuum becomes more complete the hose turns, as shown by the arrows in FIGURE 2; eventually leaving the film in thermally responsive contact with the article 10 in the area defined by the inner circumference of the member 14. The vacuum is maintained during testing and released when the testing is completed.

Figure 3:
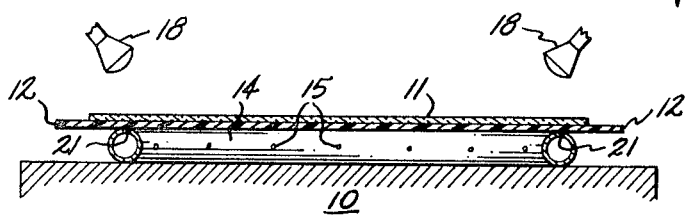
FIGURES 3 through 6 show various embodiments of layers capable of being employed in FIGURE 2.

FIGURE 3 (cut along line A—A of FIGURE 2) shows a film 12 being placed upon member 14 held in place by adhesive 21 which member 14 rests on a substrate 10 to be tested. The film 12 is coated with a filled cholesteric compound layer 11. Typical embodiments of film 12 are saran, Teflon, polyethylene, polyvinyl alcohol and clear plastics. Another arrangement possible for FIGURE 3 is an unfilled cholesteric material layer 11 when the substrate 10 is a dark article which of its own accord will bring out the color patterns of the unfilled cholesteric material 11.

Figure 4:
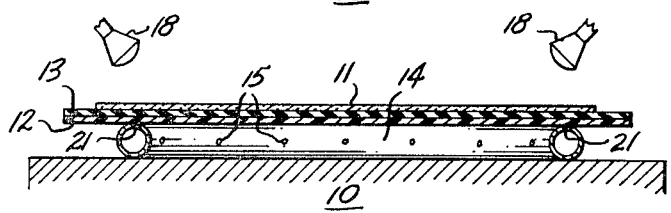

FIGURE 4 sets forth a combination of film 12 with the member 14, the film 12 being held in place by adhesive 21 upon which film 12 is a dark opaque film 13 followed by a topmost coating layer of an unfilled cholesteric medium 11. A typical embodiment of film 13 would be a black carbon filled polymeric film.

Figure 5:
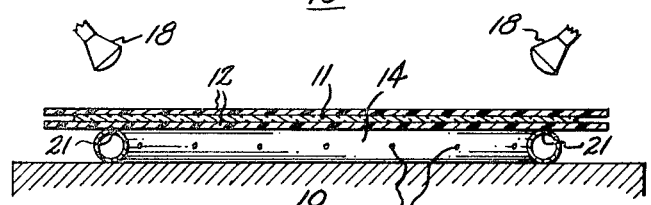

A further embodiment is shown in FIGURE 5 in which substrate 10 has a member 14 resting thereon with a film 12 being held in place by adhesive 21 upon which film 12 is filled liquid crystal layer 11 followed by a topmost film 12. Typical embodiments of such a film 12 would be saran, Teflon, polyethylene, polyvinyl alcohol and clear plastics. Another arrangement possible for FIGURE 5 is using an unfilled cholesteric material 11 when the substrate 10 is a dark article which of its own accord will bring out the color pattern of the cholesteric material 11. Again layer 12 is the topmost film with a second layer being the bottommost film hus surrounding layer 11 and layer 12 is constituted as set forth above. It is also possible to have the layer 12 which comes in contact with the substrate 10 when vacuum is applied comprised of a dark opaque layer when using an unfilled cholesteric medium on a light colored substrate 10. A typical embodiment of the dark layer would be as set forth for FIGURE 4.

Figure 6:
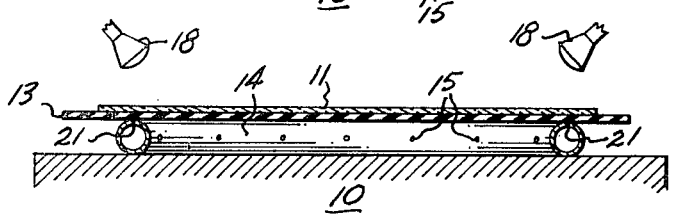

FIGURE 6 shows a dark opaque film 13 resting on the hollow member 14 with an unfilled cholesteric layer 11. The dark opaque layer 13 can be of the same materials as listed for layer 13 in FIGURE 4.

After a thermally responsive contact has been achieved between the cholesteric medium and the article to be tested, application of heat is commenced by a number of means such as heat lamps, circulating fluids, enclosed heating ovens, electrical resistance setups and any device for impinging hot air currents so that the temperature of the article 10 and the cholesteric medium 11 are heated to a temperature producing at least a first color transition for areas of the cholesteric medium. At this point it should be noted that any discontinuities in the substrate 10 will have different thermally responsive characteristics being shown in the cholesteric layer 11 so that discontinuities will be defined by a color discontinuity within the cholesteric layer 11. Heating can further be conducted until a multiplicity of color transitions takes place within the cholesteric layer at the point of the discontinuity in the substrate (that is, depending on the composition of the liquid crystal mixture being employed, the color changes will normally be from clear to red to yellow to green to blue on heating and vice versa on cooling).

It is also possible to record the thermal patterns which develop by means of motion pictures, sketches, etc. Such recordings can be used to very accurately form overlays on the part and precisely locate the exact configuration of the discontinuity detected.

We have also studied the feasibility of preparing (by encapsulation) sandwiches of liquid crystals using very thin (in the order of 0.001 inch) film (typically saran wrap, Teflon or polyethylene films) to permit inspection of surfaces without the necessity of painting them each time they are tested. The objective of this preparation is to obtain an encapsulated cholesteric film which can be easily manipulated without coming off on the person's hands who is handling the film or being left on the part being tested. To produce these thin films, we use the vacuum member 14 described above to draw the thin film, for example, saran wrap, tight and then paint the film with liquid crystals. The first film is then cut to the inner dimensions of the vacuum frame (member 14) and a second film is placed on the frame. The frame is next placed over the first film so as to have the edges of the film within the circumference defined by the vacuum frame. When the frame is re-evacuated, the second film is pressed against the liquid crystal layer and forms an air-free sandwich. The sandwich can then be placed on the surface of an article for testing and reused repeatedly. Such sandwiches have very high, efficient thermal responsiveness when molded to said substrate. It is readily apparent that such permanent sandwiches are easily handled and add an efficiency factor to any nondestructive testing applications.

Reference to U.S. application Ser. No. 596,712, filed Nov. 23, 1966, by Wayne Woodmansee which describes a series of applications of liquid crystal media in nondestructive testing is also representative of the applications which are possible utilizing the instant invention. It is recognized that people skilled in the art of nondestructive testing and other arts will recognize further applications and utilizations of the methods set forth in the instant invention.

It is also possible to have the first member 19 as shown in FIGURE 2 being a bag where substrate 10 is a relatively small part capable of fitting into a bag.

The many advantages of the instant invention will be readily utilized by any laboratory, hospital, assembly line or other establishments doing nondestructive testing applications, thermal measurements over a surface area or other heat sensitive applications. No expensive initial investment is necessary to use the methods of the instant invention. The testing techniques are adaptable to bodies with large, irregular surface areas as well as conventional shapes. Further, the testing techniques are readily understood and conducted by production personnel.

While we have described and illustrated some preferred methods of our invention, it should be understood that many modifications may be made without departing from the spirit and the scope of the invention, and it should therefore be understood that the invention is limited only by the scope of the appended claims.

We claim:
1. A method of achieving contact between at least one solid film and a surface area of a substrate comprising the steps of
   (a) defining the surface area of the substrate on which contact between the solid film and the substrate is to be established by use of a flexible, loop forming tubular means, said tubular means having therein at least an opening on the inside circumference thereof and an opening on the outside circumference,
   (b) covering the top of the tubular means with at least one solid film so as to achieve adhesion between the tubular means and the solid film and providing a space between said solid film and said substrate,
   (c) drawing a vacuum through said tubular means through said openings thus initially causing the solid film to contact said substrate in the defined surface area, then further causing essentially all of the solid film to contact said substrate in the defined surface area until said tubular means rotates toward its inner circumference.

2. The method according to claim 1 wherein the top of the tubular means is covered with a film layer having thereon a coating of a cholesteric medium.

3. The method according to claim 1 wherein the top of the tubular means is covered with at least two film layers, one of which is a dark opaque film layer, said layers having thereon a cholesteric medium.

4. The method according to claim 1 wherein the top of the tubular means is covered with a composite layer system comprising a cholesteric medium between two film layers.

5. The method according to claim 1 wherein the top of the tubular means is covered with a dark opaque film having thereon a cholesteric medium.

6. A method of defining discontinuities in a substrate comprising the steps of
   (a) defining the surface area of the substrate on which a thermally responsive contact between at least one solid film having thereon a liquid crystal medium and the substrate is to be established by use of a flexible, loop forming, tubular means, said tubular means having therein at least an opening on the inside circumference thereof and one opening on the outside circumference,
   (b) covering the top of the tubular means with at least one solid film having thereon a liquid crystal medium so as to achieve adhesion between the tubular means and the solid film, providing a space between said solid film and said substrate,
   (c) drawing a vacuum through said tubular means through said openings thus initially causing the solid film to contact said substrate in the defined surface area in a thermally responsive contact then further causing essentially all of the solid film to contact said substrate in the defined surface area until said tubular means rotates toward its inner circumference, and
   (d) thermally cycling the cholesteric material to at least one change in color.

7. The method according to claim 6 wherein is performed the subsequent step of permanently recording the change in color during the thermal cycling.

8. The method according to claim 6 wherein the thermal cycling step is performed to achieve a multiplicity of color changes.

References Cited

UNITED STATES PATENTS

| | | | |
|---|---|---|---|
| 1,870,284 | 8/1932 | Drake | 156—104 |
| 2,945,976 | 7/1960 | Fridrich et al. | 156—285 XR |
| 3,034,334 | 5/1962 | De Forest | 73—15.4 |
| 2,991,600 | 7/1961 | Lancaster | 53—22 |

FOREIGN PATENTS 580,058  7/1958  Italy.

RICHARD C. QUEISSER, *Primary Examiner.*

U.S. Cl. X.R.

73—104; 156—285